(12) United States Patent
Gross et al.

(10) Patent No.: US 11,465,594 B2
(45) Date of Patent: Oct. 11, 2022

(54) WINDSHIELD WIPER APPARATUS

(71) Applicants: Kenneth Arthur Gross, Northridge, CA (US); Michael Anthony Gross, La Canada Flintridge, CA (US)

(72) Inventors: Kenneth Arthur Gross, Northridge, CA (US); Michael Anthony Gross, La Canada Flintridge, CA (US)

( * ) Notice: Subject to any disclaimer, the term of this patent is extended or adjusted under 35 U.S.C. 154(b) by 114 days.

(21) Appl. No.: 16/932,099

(22) Filed: Jul. 17, 2020

(65) Prior Publication Data

US 2021/0016747 A1  Jan. 21, 2021

Related U.S. Application Data

(60) Provisional application No. 62/875,092, filed on Jul. 17, 2019.

(51) Int. Cl.
*B60S 1/52* (2006.01)
*B60S 1/38* (2006.01)

(52) U.S. Cl.
CPC ............. *B60S 1/524* (2013.01); *B60S 1/3862* (2013.01); *B60S 1/528* (2013.01)

(58) Field of Classification Search
CPC ......... B60S 1/524; B60S 1/3862; B60S 1/528
See application file for complete search history.

(56) References Cited

U.S. PATENT DOCUMENTS

| | | | | | |
|---|---|---|---|---|---|
| 2,918,689 | A | * | 12/1959 | Pruett | B60S 1/524 15/250.04 |
| 3,936,901 | A | * | 2/1976 | Theckston | B60S 1/3805 15/250.04 |
| 3,958,295 | A | * | 5/1976 | Green | B60S 1/3801 15/250.451 |
| 4,060,872 | A | * | 12/1977 | Bucklitzsch | B60S 1/524 15/250.04 |

* cited by examiner

*Primary Examiner* — Andrew A Horton
(74) *Attorney, Agent, or Firm* — Risso I.P.

(57) ABSTRACT

Described is a windshield wiper apparatus that is formed to dispense fluid. The wiper apparatus includes an elongate body member having a length with a sealable channel therein that runs along the length. At least one blade protrudes downward along the length of the elongate body member. Further, a series of holes are formed such they pass from the sealable channel and through the elongate body member proximate the at least one blade. Thus, a fluid passing through the sealable channel is dispensed onto a surface proximate the at least one blade.

20 Claims, 19 Drawing Sheets

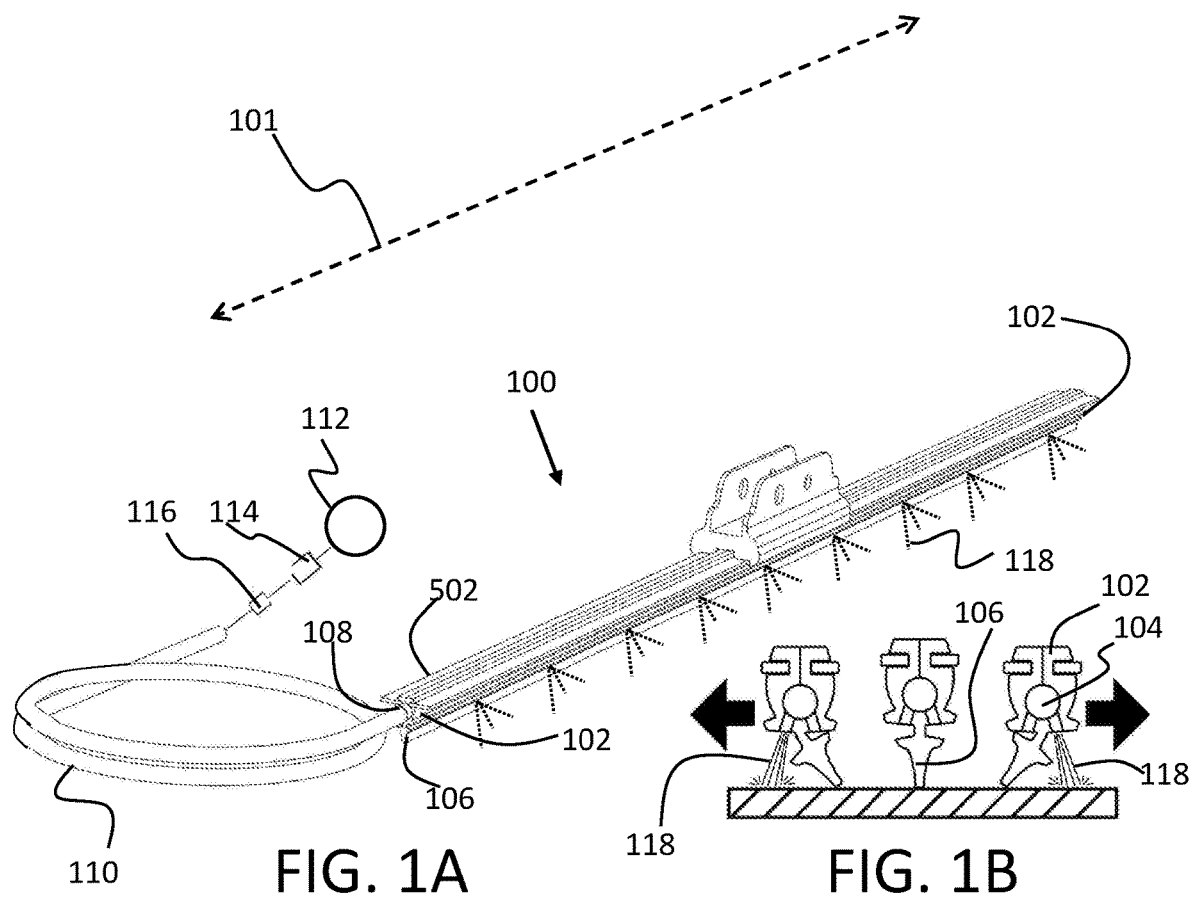

108

110

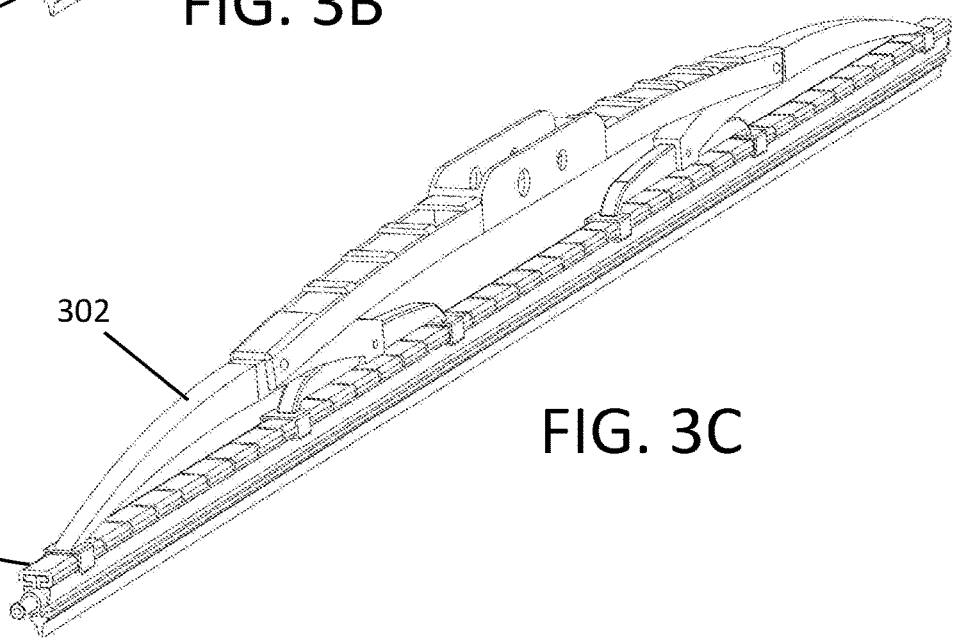

100

100

100

100

WINDSHIELD WIPER APPARATUS

CROSS-REFERENCE TO RELATED APPLICATIONS

This is a non-provisional application of U.S. Provisional Application No. 62/875,092, filed on Jul. 17, 2019, the entirety of which is incorporated herein by reference.

BACKGROUND OF THE INVENTION

(1) Field of Invention

The present invention relates to a windshield wiper blade and, more particularly, to a wiper blade apparatus that is formed to dispense water directly onto a windshield.

(2) Description of Related Art

Windshield wiper blades have long been known in the art and are typically used to wipe fluids from a windshield. While operable, existing blades and windshield wiper apparatus fail to provide for direct dispensing of a washing fluid. Instead, existing systems use nozzles or jets that are often positioned on the hood of the vehicle and that blast water across the entire windshield. In spraying water or other fluids, existing systems spray in an uncontrolled manner and do not typically reach each of the desired spots at which the wiper will reach.

Thus, a continuing need exists for a new and improved windshield wiper apparatus and blade that dispenses fluid directly onto the windshield proximate the wiper blade.

SUMMARY OF INVENTION

The present disclosure provides a windshield wiper apparatus that is formed to dispense fluid. The wiper apparatus includes an elongate body member having a length with a sealable channel therein that runs along the length. At least one blade protrudes downward along the length of the elongate body member. Further, a series of holes are formed such they pass from the sealable channel and through the elongate body member proximate the at least one blade. Thus, a fluid passing through the sealable channel is dispensed onto a surface proximate the at least one blade.

In another aspect, the elongate body member includes first and second opposing parts formed along the length, each of the first and second opposing parts having a bottom portion and a sealable top portion. The bottom portions of the first and second opposing parts are hingedly connected with one another, such that the sealable channel is formed when the sealable top portions of the first and second opposing parts are connected with one another.

In yet another aspect, the sealable top portions of the first and second opposing parts each have exterior surfaces with slots formed therein, such that when the sealable top portions of the first and second opposing parts are positioned together, the slots and sealable top portions collectively form a T-shape.

In yet another aspect, a clip is included that passes through the slots to connect the first and second opposing parts with one another and form the sealable channel within the elongate body member.

In another aspect, at least one fitting (e.g., at least one of a hose connector, barb or plug) is included. Further, the sealable channel includes opposing ends, with the opposing ends being formed to matingly engage and receive the fitting, such that when the clip connects the first and second opposing parts with one another and form the sealable channel, the fitting is securely affixed within the sealable channel to form a leakproof seal therebetween.

In yet another aspect, the clip includes a pair of rigid strips passing through the slots, the pair of clips being held together with a wiper carriage.

In another aspect, the clip is a u-shaped clip passing through the slots.

Further, the u-shaped clip includes a length, with a series of slits formed transverse the length to form a flexible spine.

In another aspect, the u-shaped clip is formed of a series of separate u-shaped channel segments, such that the series of separate u-shaped channel segments collectively form a flexible spine.

In yet another aspect, sealable top portions of the first and second opposing parts each have opposing sealing surfaces, the opposing sealing surfaces being shaped such that when pressed together, a tortious path is formed between the opposing sealing surfaces.

Further, sealable top portions of the first and second opposing parts each have opposing sealing surfaces, the opposing sealing surfaces each having groove formed therein to accommodate a sealant when the opposing sealing surfaces are pressed together.

In yet another aspect, the sealable channel has a surrounding interior wall running along the length of the elongate body member, and wherein one or more grooves are formed in the surrounding interior wall along the length of the body member to add in the formation of the sealable channel.

In another aspect, the elongate body member includes a base portion with a sleeve portion extending therefrom, the sleeve portion formed to interlock with the base portion and form the sealable channel therein.

In another aspect, the base portion includes a first slot formed therein and a first catch, and wherein the sleeve portion terminates in a second catch, such that when the sleeve portion interlocks with the base portion, the second catch matingly engages with the first catch to form a second slot between the sleeve portion and the base portion.

Finally, as can be appreciated by one in the art, the present invention also comprises a method for forming and using the invention as described herein.

BRIEF DESCRIPTION OF THE DRAWINGS

The objects, features and advantages of the present invention will be apparent from the following detailed descriptions of the various aspects of the invention in conjunction with reference to the following drawings, where:

FIG. 1A is an illustration of a windshield wiper apparatus according to various embodiments of the present invention;

FIG. 1B is a cross-sectional view illustration of the windshield wiper apparatus as depicted in FIG. 1A, depicting the windshield wiper apparatus as dispensing fluid;

FIG. 3A is an illustration of a windshield wiper apparatus according to various embodiments of the present invention, depicting an aspect where the clip is a u-shaped clip;

FIG. 3B is an illustration of the windshield wiper apparatus as depicted in FIG. 3A, depicting an elongate body member being sealed through use of the u-shaped clip;

FIG. 3C is an illustration of the windshield wiper apparatus as depicted in FIG. 3A, depicting the elongate body member sealing against a hose connector, as well as being affixed with a wiper carriage;

DETAILED DESCRIPTION

Figure 1C:
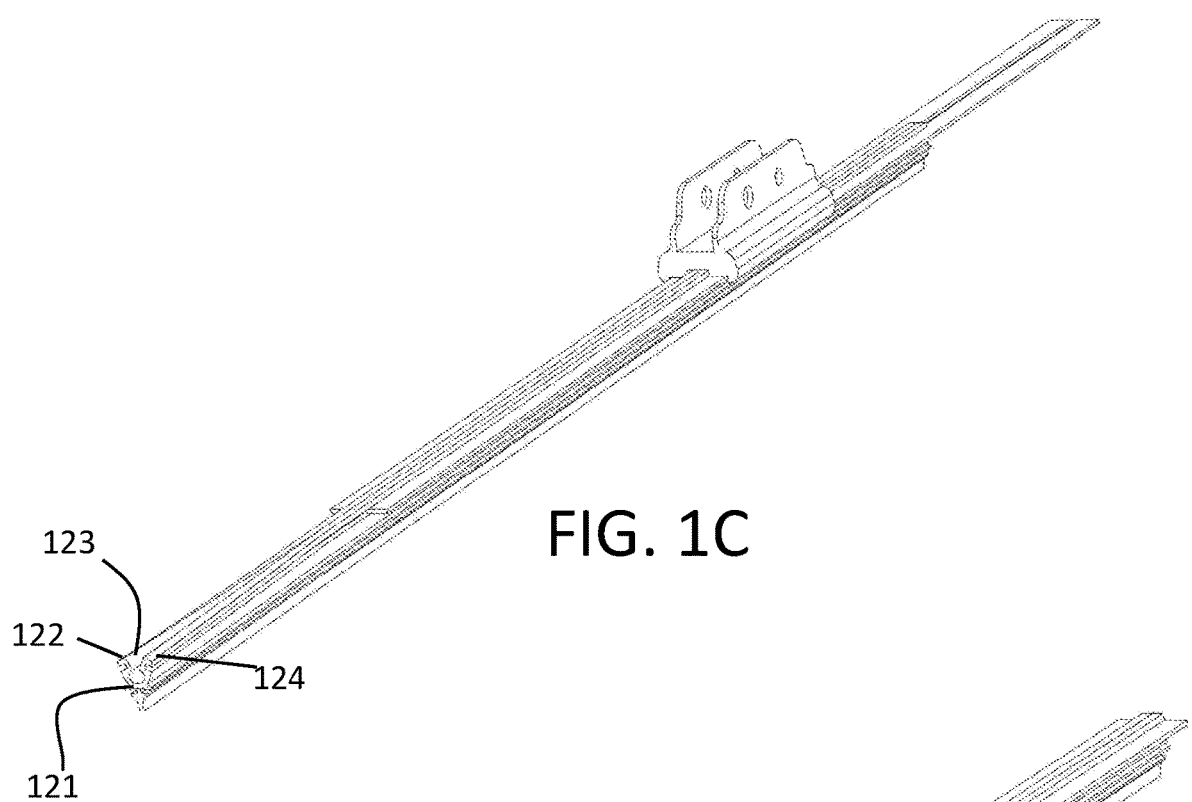
FIG. 1C is an illustration of the windshield wiper apparatus as depicted in FIG. 1A, depicting an elongate body member being sealed through use of a clip.

The present invention relates to a windshield wiper blade and, more particularly, to a wiper blade assembly that is formed to dispense water onto a windshield. The following description is presented to enable one of ordinary skill in the art to make and use the invention and to incorporate it in the context of particular applications. Various modifications, as well as a variety of uses in different applications will be readily apparent to those skilled in the art, and the general principles defined herein may be applied to a wide range of embodiments. Thus, the present invention is not intended to be limited to the embodiments presented, but is to be accorded the widest scope consistent with the principles and novel features disclosed herein.

In the following detailed description, numerous specific details are set forth in order to provide a more thorough understanding of the present invention. However, it will be apparent to one skilled in the art that the present invention may be practiced without necessarily being limited to these specific details. In other instances, well-known structures and devices are shown in block diagram form, rather than in detail, in order to avoid obscuring the present invention.

The reader's attention is directed to all papers and documents which are filed concurrently with this specification and which are open to public inspection with this specification, and the contents of all such papers and documents are incorporated herein by reference. All the features disclosed in this specification, (including any accompanying claims, abstract, and drawings) may be replaced by alternative features serving the same, equivalent or similar purpose, unless expressly stated otherwise. Thus, unless expressly stated otherwise, each feature disclosed is only one example of a generic series of equivalent or similar features.

Furthermore, any element in a claim that does not explicitly state "means for" performing a specified function, or "step for" performing a specific function, is not to be interpreted as a "means" or "step" clause as specified in 35 U.S.C. Section 112, Paragraph 6. In particular, the use of "step of" or "act of" in the claims herein is not intended to invoke the provisions of 35 U.S.C. 112, Paragraph 6.

Please note, if used, the labels left, right, front, back, top, bottom, forward, reverse, clockwise and counter clockwise have been used for convenience purposes only and are not intended to imply any particular fixed direction. Instead, they are used to reflect relative locations and/or directions between various portions of an object.

(1) Description

The present disclosure is directed to a unique windshield wiper apparatus. The wiper apparatus is formed in any suitable manner that provides a sealable channel to allow a fluid to pass through the apparatus and be dispersed directly onto a windshield. As a non-limiting example, the wiper apparatus can be machined, extruded, molded, stamped, or cast, of a semi-rigid rubber or plastic material (or any other suitable material). Notably, the wiper apparatus can be formed in a variety of different manners by which the sealable channel can be sealed as well as by which the fluid can be dispensed.

For example and a shown in FIG. 1A, the present disclosure provides a wiper apparatus 100 that includes an elongate body member 102 having a length with a sealable channel 104 therein that runs along the length 101. At least one blade 106 protrudes downward along the length of the elongate body member 102. The blade 106 is formed to be flexible and wipe fluid from a surface as it is passed along the surface. A fitting, such as a hose connector 108 (or barbed hose connector) can be affixed within the sealable channel 104 to allow tubing or a hose (i.e., fluid conduit 110) to easily connect with the hose connector 108. As can be appreciated, a fluid reservoir 112, fluid delivery pump 114, check valve or solenoid valve 116, or any other components as maybe necessary can also be included to provide and/or force fluid through the fluid conduit 110 and into the sealable channel. Once in the sealable channel 104, the fluid 118 can be directed through a series of holes passing from the sealable channel and through the elongate member to be dispensed onto a surface. The sealable channel is further depicted in the cross-sectional illustrations as shown in FIG. 1B, which illustrates an aspect in which the series of holes 120 are formed on both sides of a single blade 106 to dispense the fluid 118 on both sides of the blade 106. It should be noted that the series of holes 120 are formed along the length of the elongate body member 102 to direct the fluid 118 out and onto the surface as the blade 106 moves between a first position and a second position (as shown in FIG. 1B). The holes can be formed directly across from one another (as shown in FIG. 1B) along the length or alternating sides of the blade 106 along the length, or any combination thereof.

Thus, in this example, the series of holes passes through the elongate body 102 member such that a first group of holes is formed to dispense fluid 118 on a first side of the at least one blade 106 (while the blade 106 is in the first position), while a second group of holes is formed to dispense fluid 118 on a second side of the blade 106 (while the blade 106 is in the second position). As shown in FIG. 1B, motion of the blade 106 from first position to the second position diverts the fluid 118 from the first to second group of holes (and vice versa).

As noted above, the sealable channel 104 can be sealed using any suitable shaping and/or technique of the elongate body member 102. For example and as shown in FIGS. 1C through 1F, the elongate body member 102 includes first and second opposing parts 122 and 124 formed along the length. Each of the first and second opposing parts 122 and 124 having a bottom portion 121 and a sealable top portion 123. In the aspect as depicted in FIGS. 1A through 1F, the bottom portions 121 of the first and second opposing parts 122 and 124 are hingedly connected with one another, such that the sealable channel 104 is formed when the sealable top portions of the first and second opposing parts 122 and 124 are connected with one another.

Figure 1D:
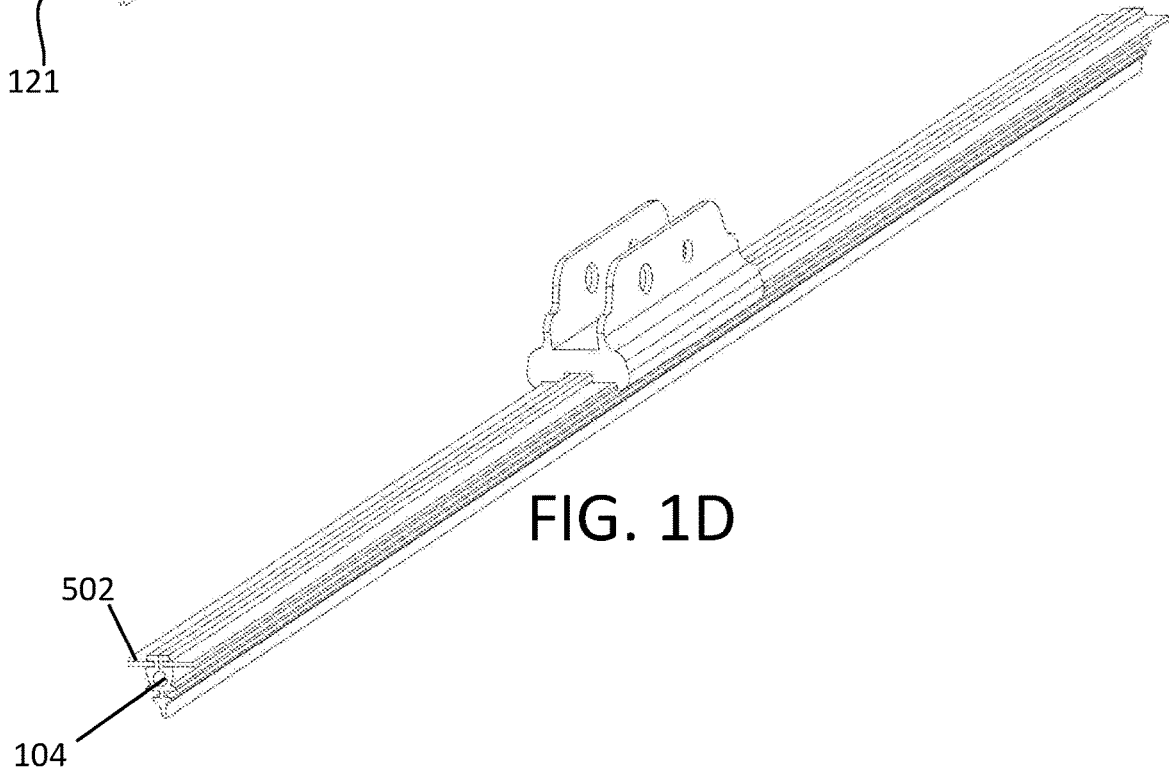
FIG. 1D is an illustration of the windshield wiper apparatus as depicted in FIG. 1A, depicting the elongate body member being sealed through use of the clip.
Figure 1E:
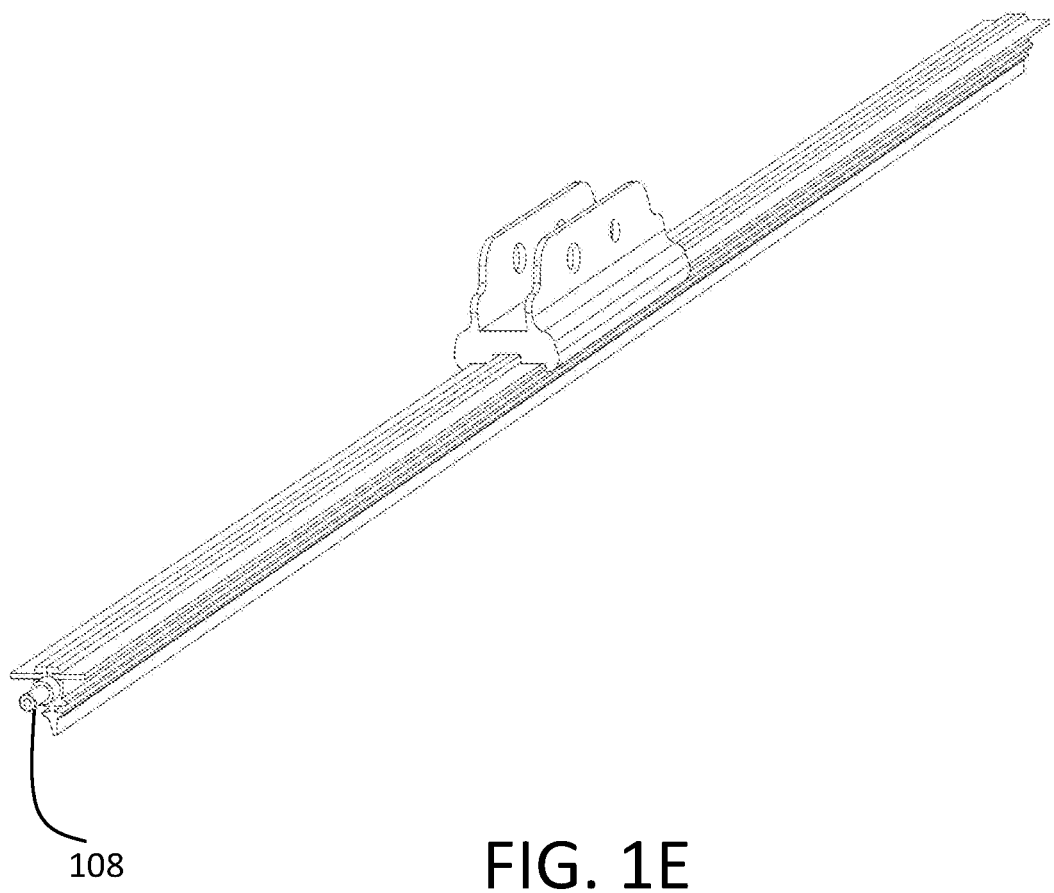
FIG. 1E is an illustration of the windshield wiper apparatus as depicted in FIG. 1A, depicting the elongate body member sealing against a hose connector.
Figure 1F:
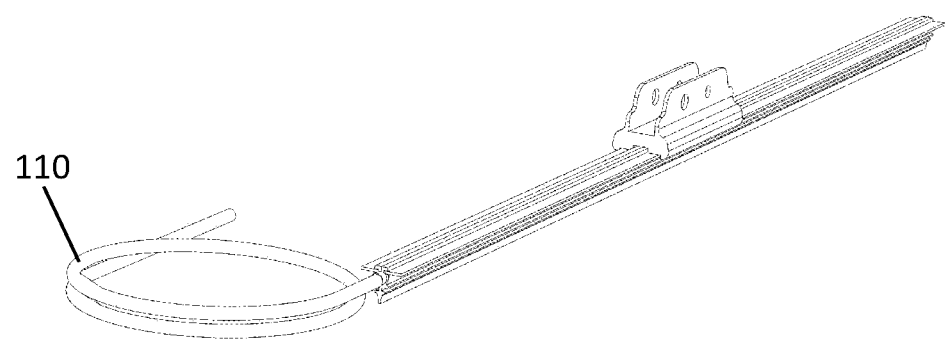
FIG. 1F is an illustration of the windshield wiper apparatus as depicted in FIG. 1A, depicting a hose or tubing connected with the hose connector.
Figures 2A, 2B:
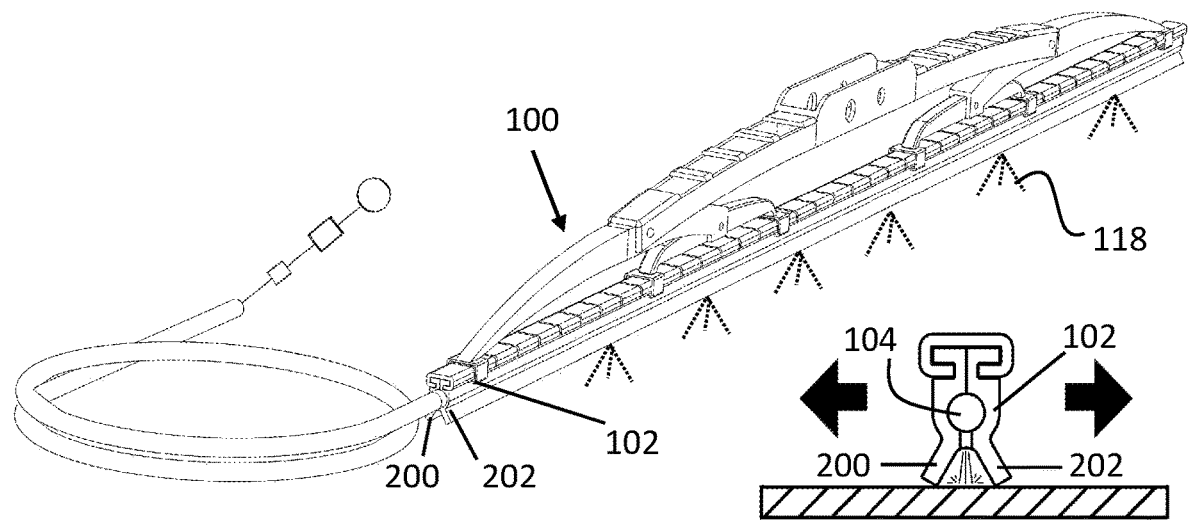
FIG. 2A is an illustration of a windshield wiper apparatus according to various embodiments of the present invention.
FIG. 2B is a cross-sectional view illustration of the windshield wiper apparatus as depicted in FIG. 2A, depicting the windshield wiper apparatus as dispensing fluid.
Figure 2C:
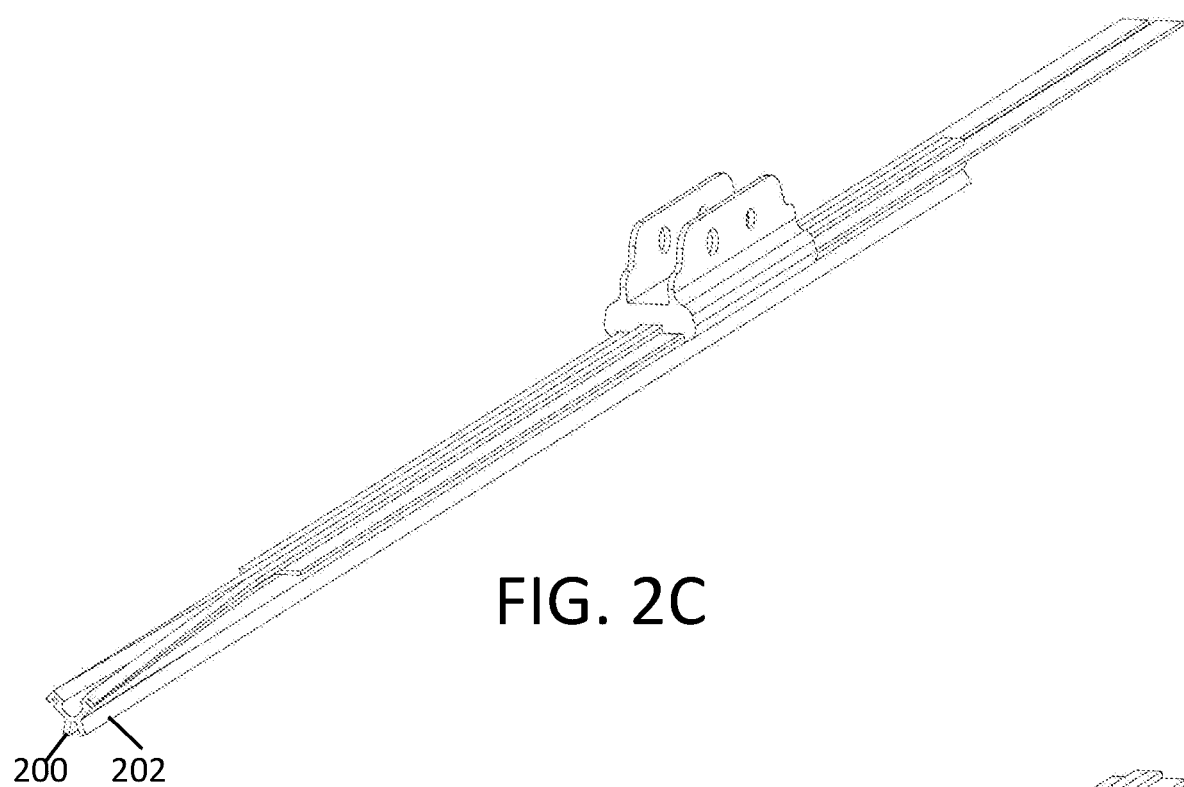
FIG. 2C is an illustration of the windshield wiper apparatus as depicted in FIG. 2A, depicting an elongate body member being sealed through use of a clip.
Figure 2D:
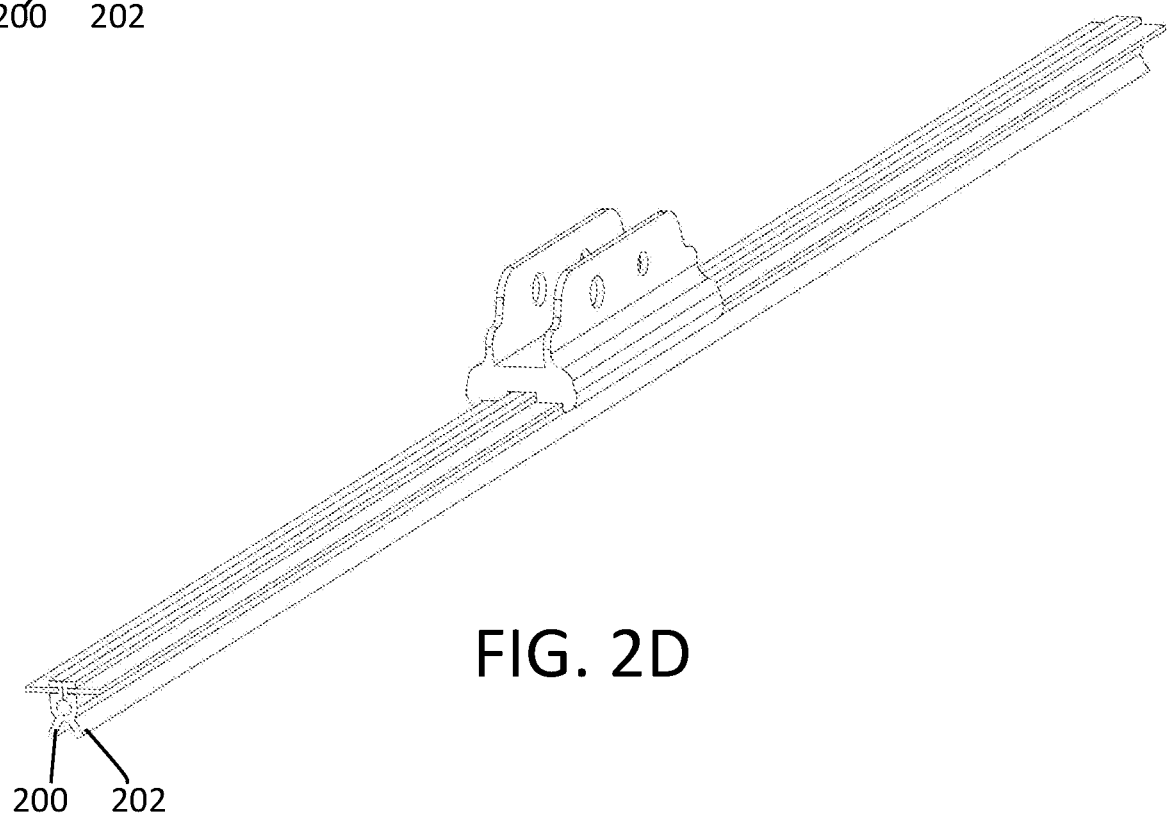
FIG. 2D is an illustration of the windshield wiper apparatus as depicted in FIG. 2A, depicting the elongate body member being sealed through use of the clip.
Figure 2E:
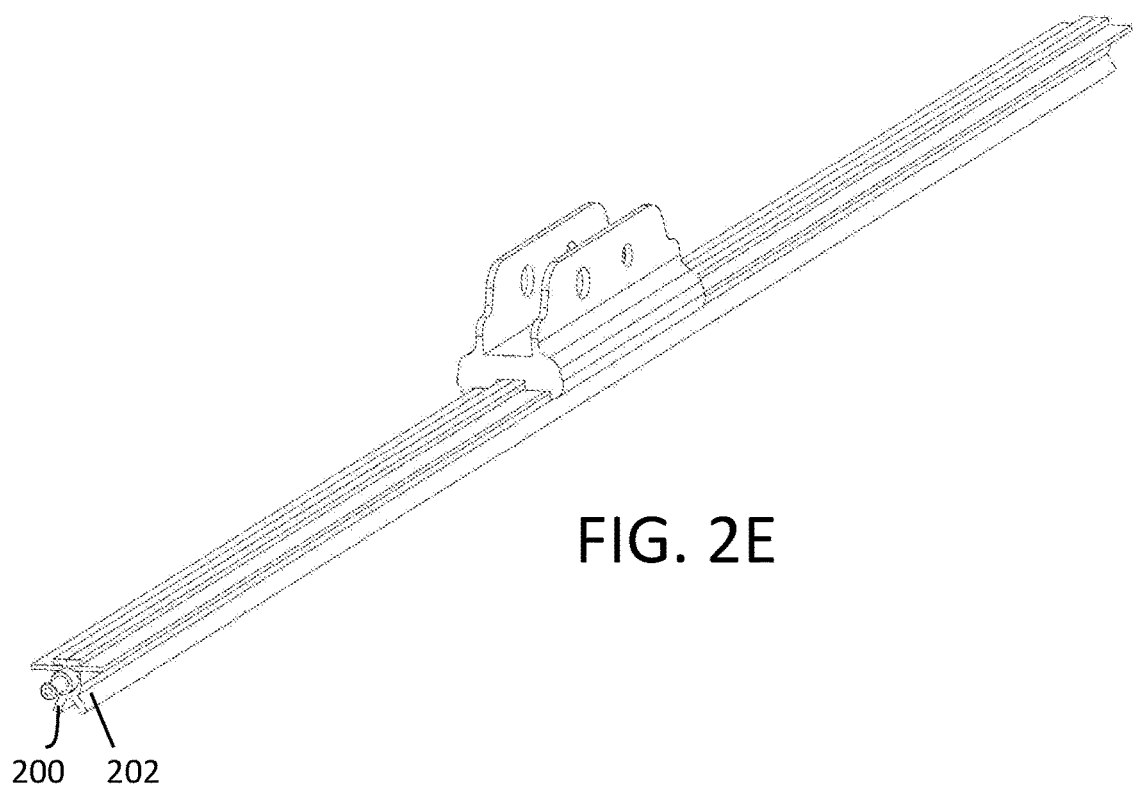
FIG. 2E is an illustration of the windshield wiper apparatus as depicted in FIG. 2A, depicting the elongate body member sealing against a hose connector.
Figure 2F:
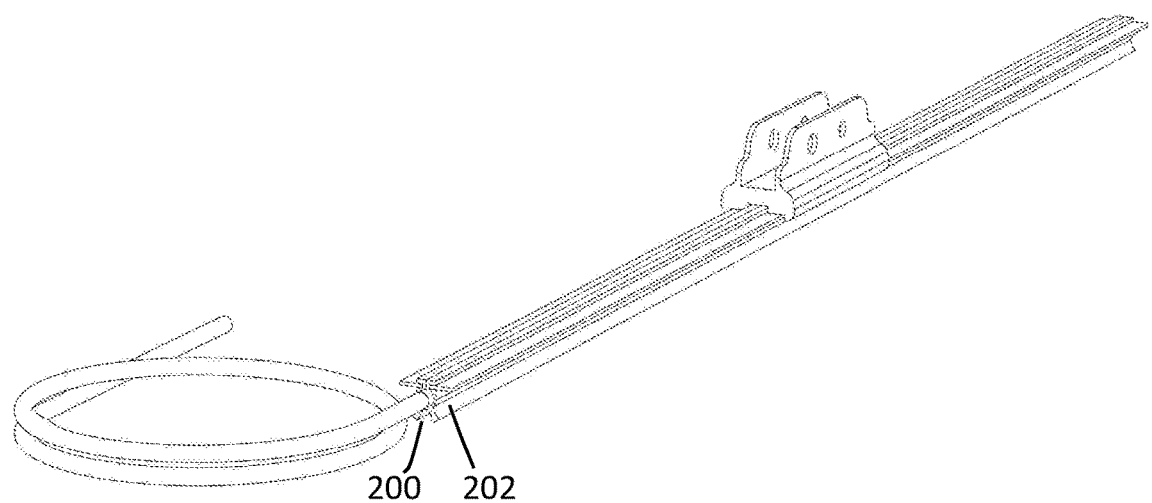
FIG. 2F is an illustration of the windshield wiper apparatus as depicted in FIG. 2A, depicting a hose or tubing connected with the hose connector.
Figure 5A:
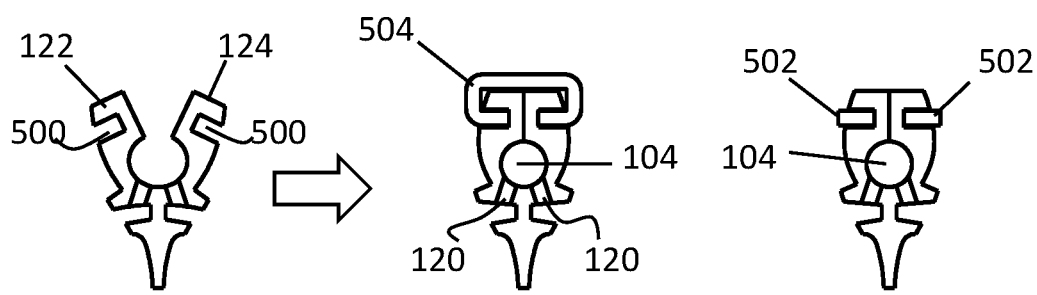
FIG. 5A is a cross-sectional view illustration of the windshield wiper apparatus according to various embodiments of the present invention, depicting an aspect where the series of holes are formed on both sides of the wiper blade.

The first and second opposing parts 122 and 124 can be connected using any suitable mechanism or device. As a non-limiting example and as shown in FIG. 5A, the sealable top portions of the first and second opposing parts 122 and 124 each have exterior surfaces with slots 500 formed therein, such that when the sealable top portions of the first and second opposing parts 122 and 124 are positioned together, the slots 500 and sealable top portions collectively form a T-shape. With the T-shape sealable top, a clip can be passed through the slots 500 to connect the first and second opposing parts 122 and 124 with one another and form the sealable channel 104 within the elongate body member. FIG. 5A depicts two example clips. One example as shown in both FIGS. 5A and 1A, is where the clip 502 includes a pair of rigid strips or clips passing through the slots, the pair of clips being held together with the wiper carriage. In another aspect and as also depicted in FIG. 5A, the clip can be a U-shaped clip 504 that passes through the slots to hold the first and second opposing parts 122 and 124 together. For further understanding, FIG. 1C depicts the first and second opposing parts 122 and 124, while FIG. 1D depicts the clip 502 holding the opposing parts together to form the sealable channel 104. Additionally, FIG. 1E depicts the hose connector 108 or barb being affixed within the sealable channel while FIG. 1F depicts a fluid conduit connector with the hose connector 108. In practice, one would likely position the hose connector 108 within the channel of the elongate body member before attaching the clip 502 to allow the sealable channel to form a leakproof seal around the hose connector 108. Also, a fitting such as a plug may be connected on an opposing end (opposite the barb or hose connector 108) of the sealable channel to seal the sealable channel.

In another aspect and as shown in FIGS. 2A through 2F, the windshield wiper 100 is formed such that the at least one blade includes two blades 200 and 202 that protrude downward along the length of the elongate body member 102. In this aspect and as shown, the series of holes is formed from the sealable channel and through the body member 102 along its length, with the holes formed downward and between the two blades 200 and 200 to dispense fluid 118 from the sealable channel and out between the two blades 200 and 202.

As noted above, the windshield wiper can be sealed using any suitable mechanism or technique. For example and as shown in FIGS. 3A through 3C, the clip can be formed as a U-shaped clip 300 that passes around the elongate body and resides in the slots to hold the opposing parts 122 and 124 together to form the sealable channel 104. A wiper carriage 302 can then be affixed with the clip 300 (or any clip) to connect the windshield wiper with the vehicle's wiping system.

Figure 3D:
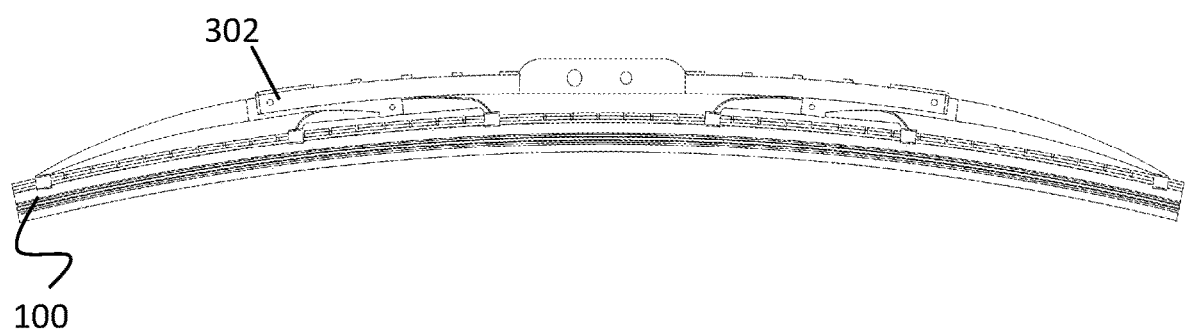
FIG. 3D is an illustration of the windshield wiper apparatus, depicting a flexible spine to allow for a curved wiper apparatus assembly.

In one aspect and as depicted in FIGS. 3A through the 3C, the U-shaped clip 300 includes a length, with a series of slits 304 formed transverse the length to form a flexible spine. In another aspect, the U-shaped clip is formed of a series of separate U-shaped channel segments 306, such that the series of separate U-shaped channel segments collectively form the flexible spine. The flexible spine allows for a curved wiper assembly, as shown in FIG. 3D. FIG. 3D depicts the windshield wiper apparatus 100 attached with the carriage 302 and flexed or otherwise curved.

Figure 4A:
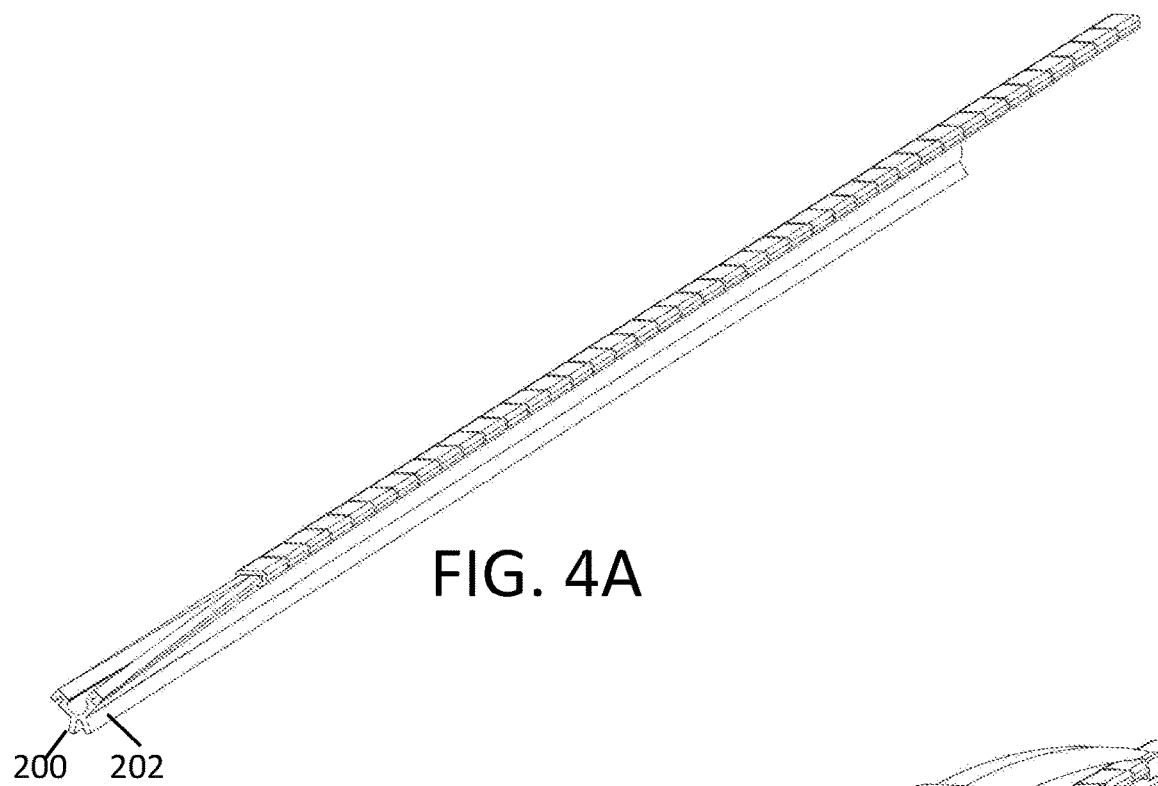
FIG. 4A is an illustration of a windshield wiper apparatus according to various embodiments of the present invention, depicting an aspect where the clip is a u-shaped clip.
Figure 4B:
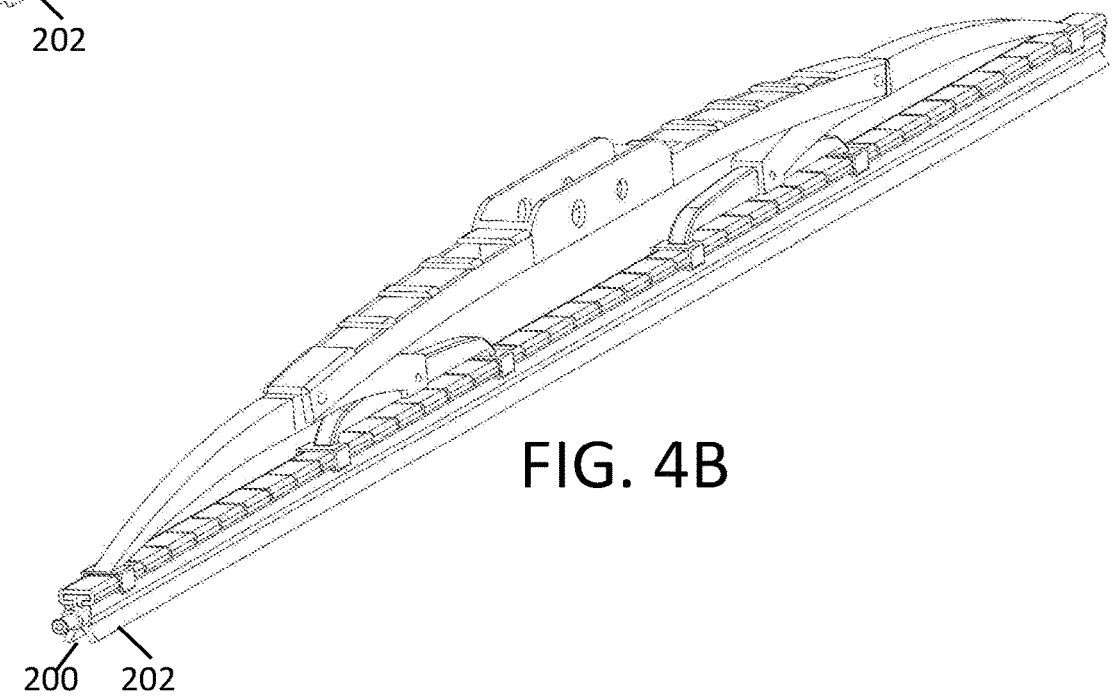
FIG. 4B is an illustration of the windshield wiper apparatus as depicted in FIG. 4A, depicting the elongate body member sealing against a hose connector, as well as being affixed with a wiper carriage.
Figures 4C, 4D:
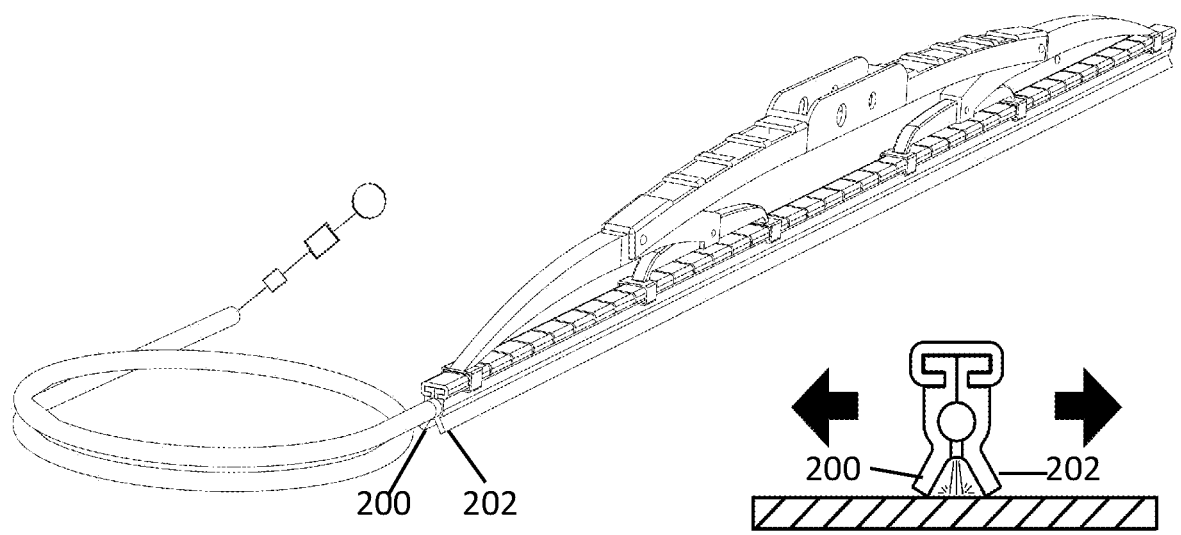
FIG. 4C is an illustration of the windshield wiper apparatus as depicted in FIG. 4A, depicting the elongate body member as being affixed with a wiper carriage, as well as depicting a hose or tubing connected with the hose connector.
FIG. 4D is a cross-sectional view illustration of the windshield wiper apparatus as depicted in FIG. 4A, depicting the windshield wiper apparatus as dispensing fluid.

The flexible spine is also depicted in FIGS. 4A through 4C, which illustrates an aspect in which the series of holes is formed between the two blades 200 and 202. Thus, as can be appreciated, the various aspects as described herein can be interchanged with one another as understood by those skilled in the art.

Figure 5B:
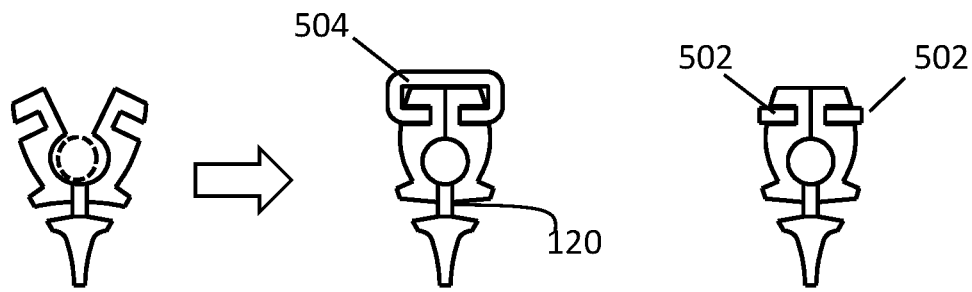
FIG. 5B is a cross-sectional view illustration of the windshield wiper apparatus according to various embodiments of the present invention, depicting an aspect where the series of holes are formed down the center of the sealable channel.
Figure 5C:
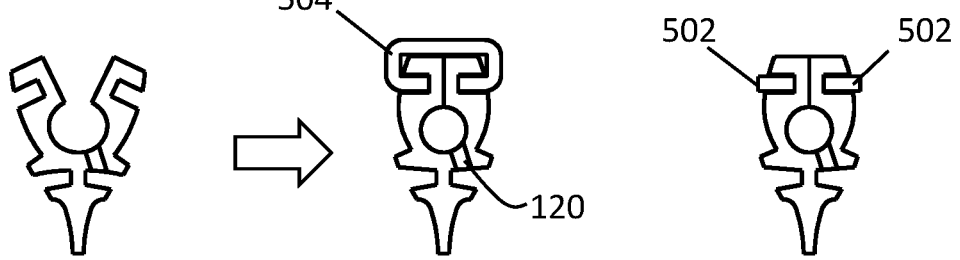
FIG. 5C is a cross-sectional view illustration of the windshield wiper apparatus according to various embodiments of the present invention, depicting an aspect where the series of holes are formed only on one side of the blade.
Figure 5D:
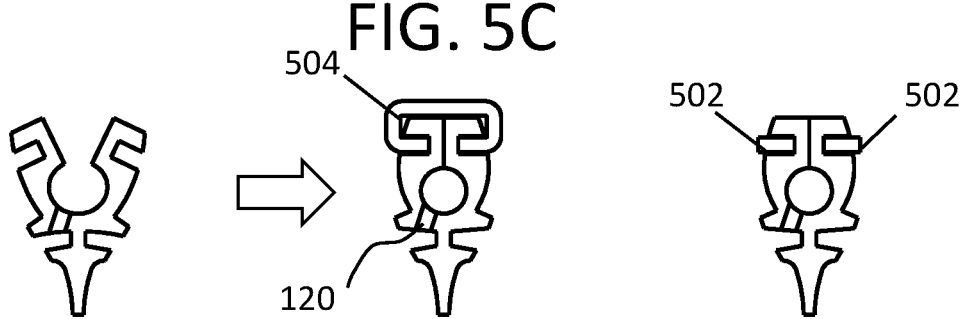
FIG. 5D is a cross-sectional view illustration of the windshield wiper apparatus according to various embodiments of the present invention, depicting an aspect where the series of holes are formed only on the other side of the blade.

As noted above, there are several configurations by which the sealable channel can be sealed and holes can be formed from the sealable channel to an exterior to dispense the fluid. For example, FIGS. 5A through 5D provide cross-sectional view illustrations, depicting several examples of the windshield wiper apparatus 100. Specifically, FIG. 5A depicts an aspect where the series of holes 120 are formed on both sides of the blade, as well as depicting the two example variations of clips 502 and 504. FIG. 5B depicts an aspect where the series of holes 120 are formed down the center of the sealable channel, as well as depicting the two variations of clips 502 and 504. FIG. 5C depicts an aspect where the series of holes 120 are formed only on one side of the blade, as well as depicting the two variations of clips 502 and 504; while FIG. 5D depicts an aspect where the series of holes 120 are formed only on the other side of the blade, as well as depicting the two variations of clips 502 and 504.

Figure 6A:
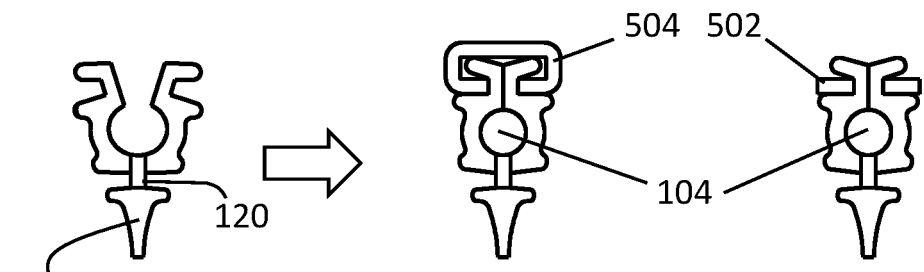
FIG. 6A is a cross-sectional view illustration of the windshield wiper apparatus according to various embodiments of the present invention, depicting an aspect where the series of holes are formed down the center of the sealable channel, as well as depicting a T-shape.
Figure 6B:
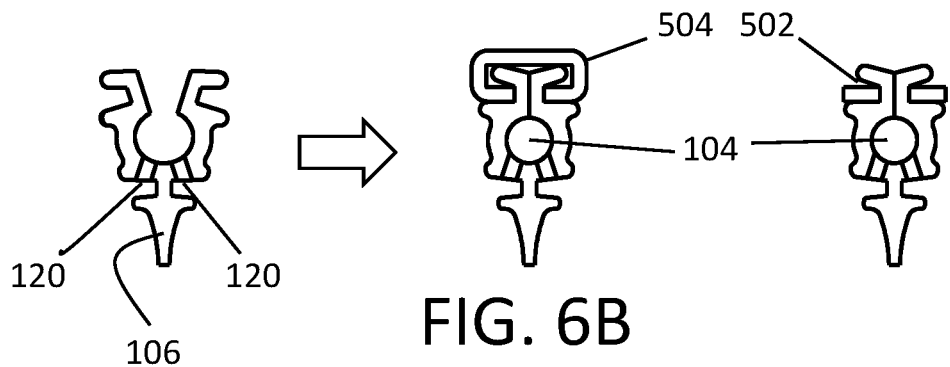
FIG. 6B is a cross-sectional view illustration of the windshield wiper apparatus according to various embodiments of the present invention, depicting an aspect where the series of holes are formed on both sides of the blade, as well as depicting a T-shape.
Figure 6C:
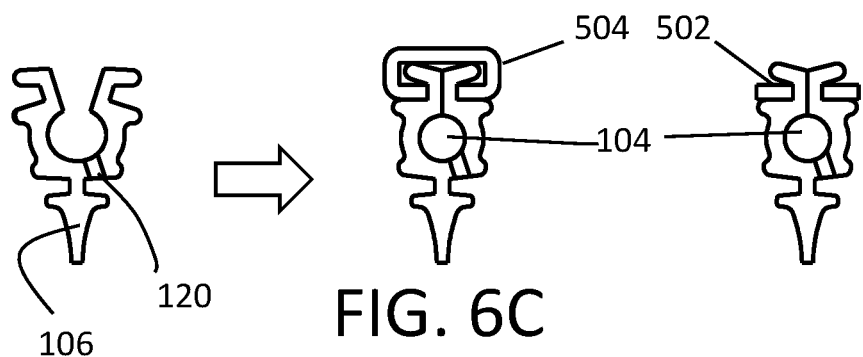
FIG. 6C is a cross-sectional view illustration of the windshield wiper apparatus according to various embodiments of the present invention, depicting an aspect where the series of holes are formed only on one side of the blade, as well as depicting a T-shape.
Figure 6D:
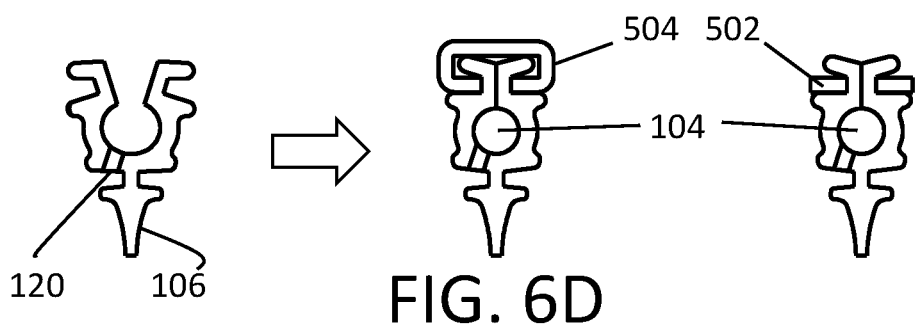
FIG. 6D is a cross-sectional view illustration of the windshield wiper apparatus according to various embodiments of the present invention, depicting an aspect where the series of holes are formed only on the other side of the blade, as well as depicting a T-shaped blade.

Further, FIGS. 6A through 6D illustrate cross-sectional views of the windshield wiper apparatus 100 according to the present disclosure, formed in a shape such that externally, the wiper blades 106 themselves mimic a traditional T-shape. Specifically, FIG. 6A depicts an aspect where the series of holes are formed down the center 120 of the sealable channel, as well as the two example variations of clips 502 and 504. FIG. 6B depicts an aspect where the series of holes 120 are formed on both sides of the blade, as well as the two variations of clips 502 and 504. FIG. 6C depicts an aspect where the series of holes 120 are formed only on one side of the blade, as well as depicting the two variations of clips 502 and 504; while FIG. 6D depicts an aspect where the series of holes 120 are formed only on the other side of the blade, as well as depicting the two variations of clips 502 and 504. This T-shape as depicted in FIGS. 6A through 6D is molded semi open to create the sealable channel 104 and holes 120 in a standard injection molded process. In other aspects, the wiper apparatus can also be extruded, but if extruded, would require an after process of laser cut, pierced, or machined holes (i.e., the series of holes) along its length. This T-shape provides appropriate side draft to open the tools with no undercut if molded in a more rigid durometer material, such as PP or Teflon. The details on the exterior of the wider base and top provide a structural advantage to allow the material to flex or bend mainly along the thinner sidewall portion, assisting in the proper formation of the center channel while maintaining the integrity of the wiper blade interaction with the formed holes or orifices to deliver fluid to the windshield. Some flex will occur in those areas, but will be minor compared to the thinner side walls, especially when molded in a medium durometer material like silicone, Kraton polymer or natural rubber.

Figure 7A:
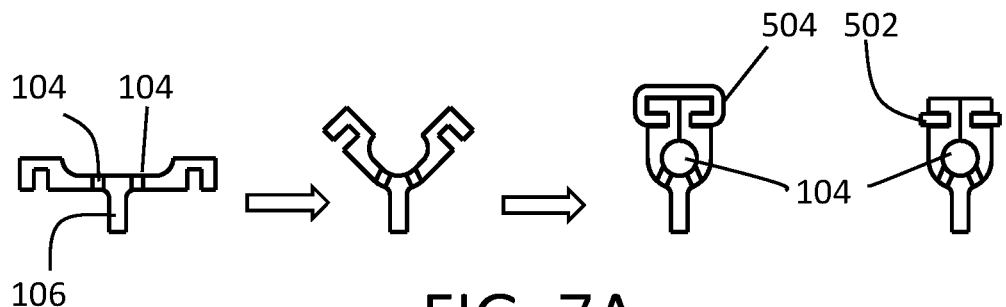
FIG. 7A is a cross-sectional view illustration of the windshield wiper apparatus according to various embodiments of the present invention, depicting an aspect where the series of holes are formed on both sides of the blade, as well as depicting a vertical shaped blade.
Figure 7B:
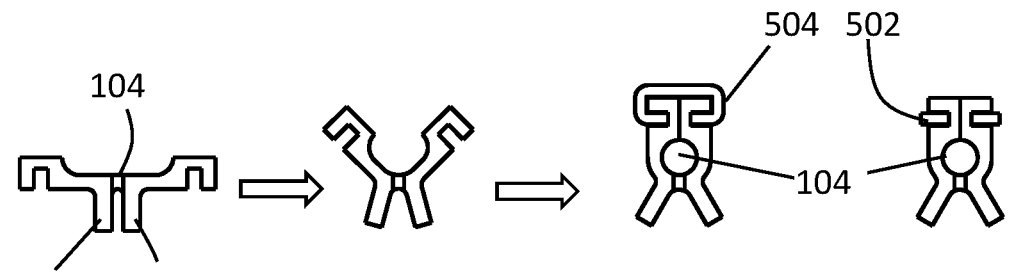
FIG. 7B is a cross-sectional view illustration of the windshield wiper apparatus according to various embodiments of the present invention, depicting an aspect where the series of holes are formed between a pair of vertical shaped blades.
Figure 7C:
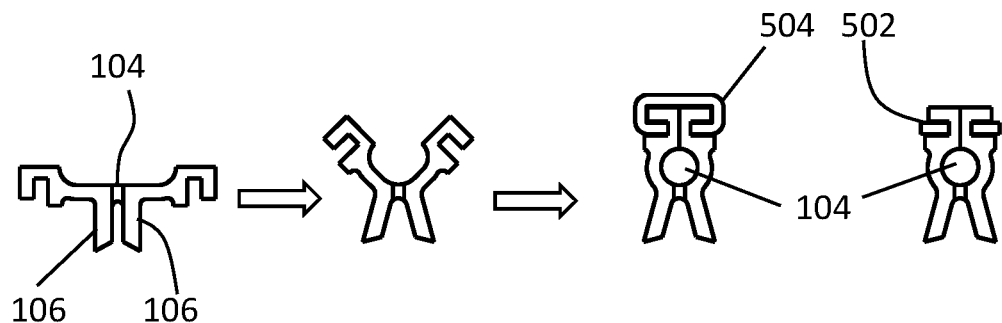
FIG. 7C is a cross-sectional view illustration of the windshield wiper apparatus according to various embodiments of the present invention, depicting an aspect where the series of holes are formed between a pair of vertical shaped blades.

To be contrasted with FIGS. 6A through 6D, FIGS. 7A through 7C illustrate cross-sectional views of the windshield wiper apparatus 100 according to the present disclosure, formed in a shape such that the blades 106 are formed in a non-traditional T-shape, or otherwise referred to herein as a vertical shaped blade. This vertical shaped blade is best suited for a machining process using a semi rigid material like Teflon (this can also be extruded or molded). By using a more rigid material suitable for machining, the vertical shaped blade can maintain its rigidity will traveling across the windshield surface. The shorter the blade 106 the stronger the structural integrity. The partial formation of the channel at the ends of this design allows the bend to create a natural curve, completing the cylindrical sealable channel 104. As shown in FIGS. 7B and 7C, the dual blade formation increases the structural integrity as the blades 106 travels across the windshield, as well as isolates the fluid in between the blades 106 as it dispenses. FIG. 7C Is a slight variation of that of FIG. 7B, creating a more unique shape for rigidity of structure at the top where the clip 502 or 504 is inserted and a more defined blade 106 angle at the bottom. It is also noted that FIG. 7A depicts an aspect where the series of holes 104 are formed on both sides of the blade 106, while FIGS. 7B and 7C depict aspects where the series of holes 104 are formed between the blades 106.

Figure 8:
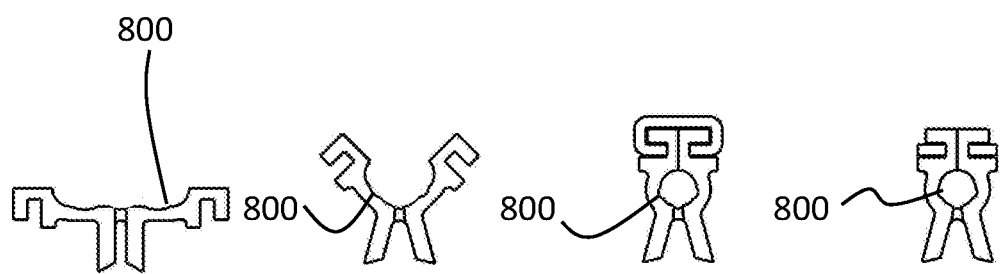
FIG. 8 is a cross-sectional view illustration of the windshield wiper apparatus according to various embodiments of the present invention, depicting aspects in which the sealable channel has a surrounding interior wall running along the length of the elongate body member.

FIG. 8 depicts aspects in which the sealable channel has a surrounding interior wall running along the length of the elongate body member. In this aspect, one or more grooves 800 are formed in the surrounding interior wall along the length of the body member to add in the formation of the sealable channel. The grooves 800 allow the opposing parts to more easily bend and connect with one another. Thus, in this aspect, the grooves 800 run in parallel to the channel 104 and may be extruded, molded, or machined into the surface to aid in forming the channel when folding a more rigid durometer material such as a polyethylene or Teflon material.

Figure 9:
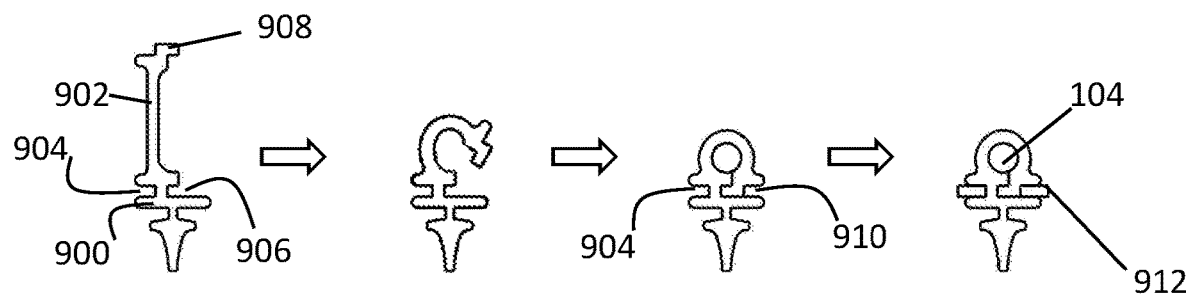
FIG. 9 is a cross-sectional view illustration of the windshield wiper apparatus according to various embodiments of the present invention, depicting an aspect in which the sealable channel is formed by a sleeve portion that affixes with a base portion of the elongate body member.

FIG. 9 illustrates yet another aspect, where the elongate body member includes a base portion 900 with a sleeve portion 902 extending therefrom. The sleeve portion 902 is formed to interlock with the base portion 900 and form the sealable channel 104 therein. To interlock, the base portion 900 includes a first slot 904 formed therein and a first catch 906, and wherein the sleeve portion 902 terminates in a second catch 908. When the sleeve portion 902 interlocks with the base portion 900, the second catch 908 matingly engages with the first catch 906 to form a second slot 910 between the sleeve portion 902 and the base portion 902. In this aspect, the clip 912 can be passed through the first and second slots 904 and 910 to seal the sleeve portion 902 against to the base portion 900 and form the sealable channel 102 within the elongate body member. As can be appreciated by those skilled in the art, in one aspect, the clip 912 includes a pair of rigid strips passing through the first and second slots 904 and 910, the pair of clips being held together with the wiper carriage that can clip on or otherwise affix with the clips.

Figure 10A:
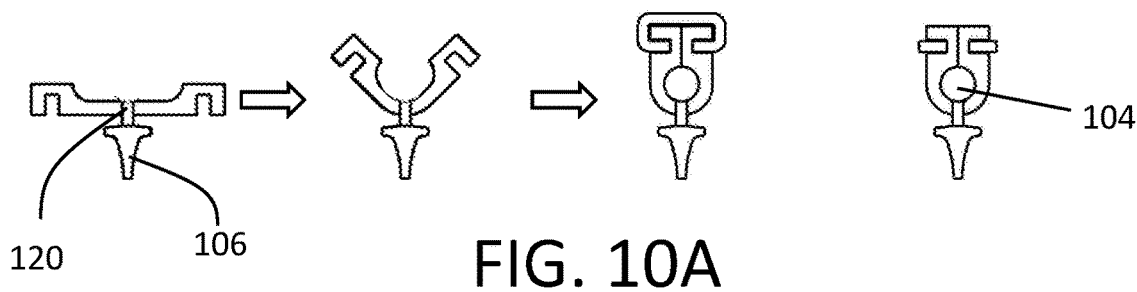
FIG. 10A is a cross-sectional view illustration of the windshield wiper apparatus according to various embodiments of the present invention, depicting an aspect in which the series of holes are formed down a center of the sealable channel.
Figure 10B:
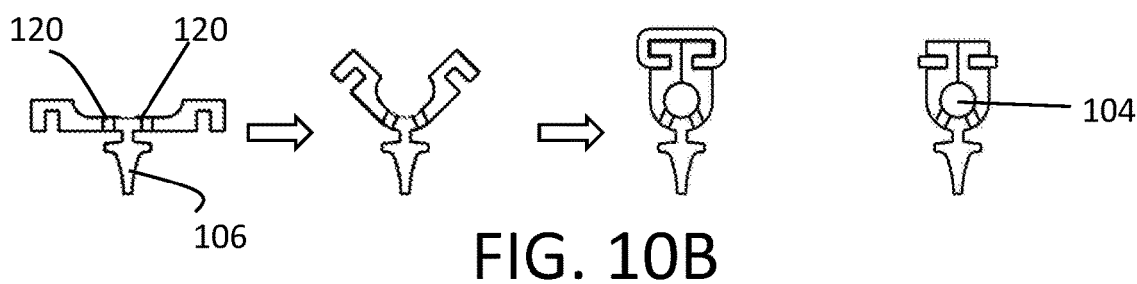
FIG. 10B is a cross-sectional view illustration of the windshield wiper apparatus according to various embodiments of the present invention, depicting an aspect in which the series of holes are formed on both sides of the blade.

FIGS. 10A and 10B depict cross-sectional views of the windshield wiper apparatus 100 according to the present disclosure, formed in a shape that has many of the benefits of the aspect as depicted in FIGS. 7A through 7C, but having a more traditional T-shaped wiper blade 106. Although not limited thereto, FIG. 10A depicts an aspect where the series of holes 120 are formed down the center of the sealable channel 104, while FIG. 10B depicts an aspect where the series of holes 120 are formed on both sides of the blade 106.

Figure 10C:
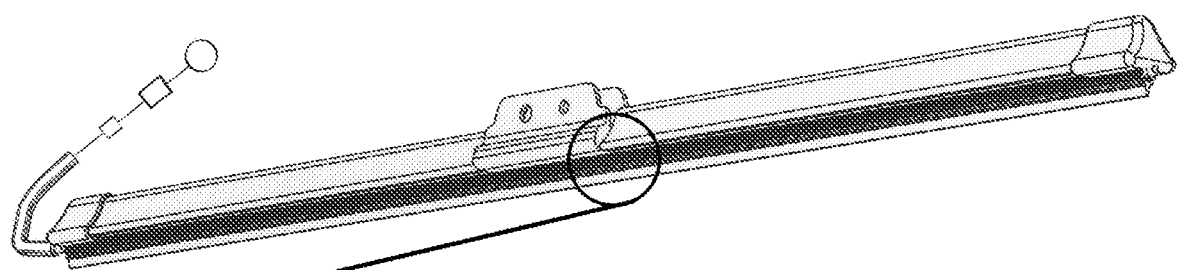
FIG. 10C is an illustration of the windshield wiper apparatus according to various embodiments of the present invention, depicting an aspect in which the series of holes are formed down a center of the sealable channel.
Figure 10D:
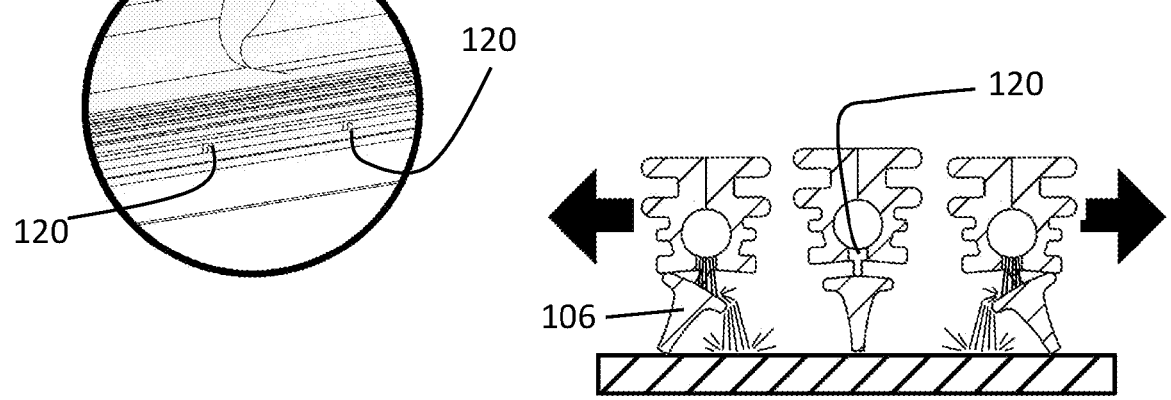
FIG. 10D is an illustration of the windshield wiper apparatus according to various embodiments of the present invention, depicting an aspect in which the series of holes are formed down a center of the sealable channel.

It should be noted that a few of the aspects as described herein are described as having the series of holes 120 formed down the center of the sealable channel 104. This concept is shown in further detail in FIGS. 10C and 10D, which illustrate the series of holes 120 formed down the center. As shown in FIG. 10D, as the blade 106 moves from side to side, the fluid falls from the sealed channel and around the blade 106.

Figure 11:
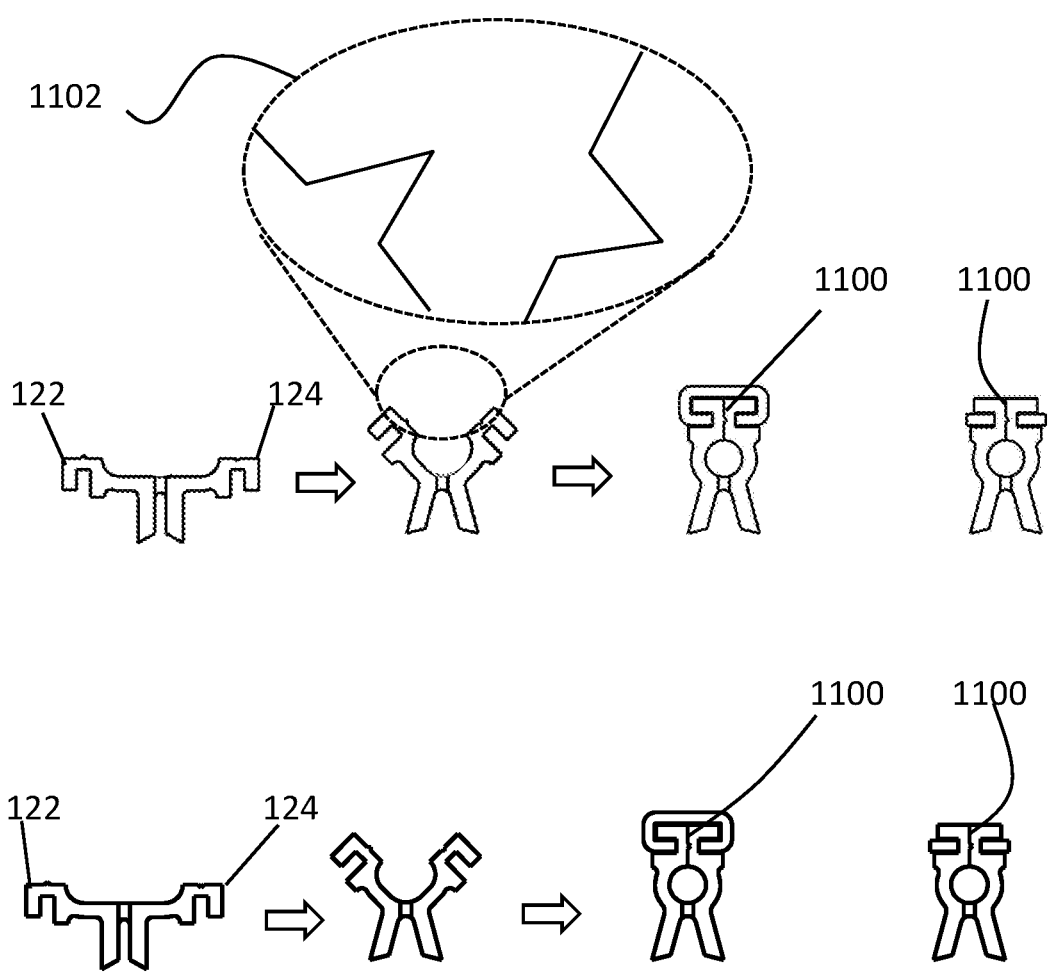
FIG. 11 is a cross-sectional view illustration of the windshield wiper apparatus, depicting an aspect in which the top portions of the first and second opposing parts each have opposing sealing surfaces, the opposing sealing surfaces being shaped such that when pressed together, a tortious path is formed between the opposing sealing surfaces.

FIG. 11 depicts aspects in which the sealable top portions of the first and second opposing parts 122 and 124 each have opposing sealing surfaces, the opposing sealing surfaces being shaped such that when pressed together, a tortious path 1100 is formed between the opposing sealing surfaces. The opposing sealing surfaces can include a variety of shapes to form the tortious path. For example, the designs include the addition of a torturous path machined, cast, formed, or molded into the faces of the sealing surfaces. The design or shaping (as shown in the exploded-view 1102) can be a triangular, semi-circle, square, or rectangular shape (or any other shape) that presses or deforms into the corresponding face to creating the tortious path which provides an additional sealing force.

Figure 12:
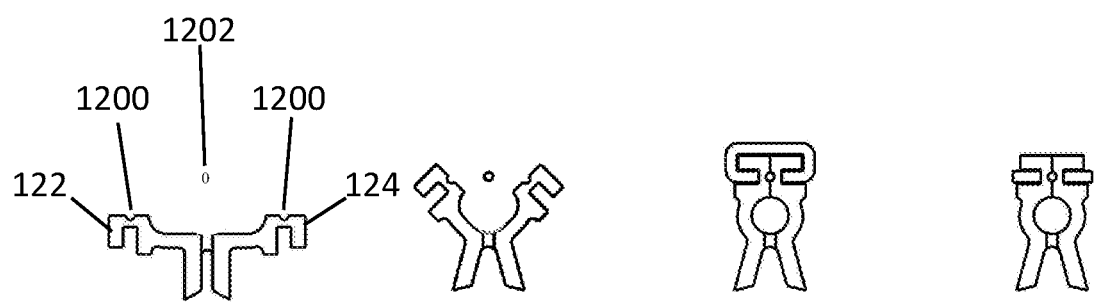
FIG. 12 is a cross-sectional view illustration of the windshield wiper apparatus, depicting an aspect in which the sealable top portions of the first and second opposing parts each have opposing sealing surfaces with a groove formed therein.

FIG. 12 depicts yet another aspect, in which the sealable top portions of the first and second opposing parts 122 and 124 each have opposing sealing surfaces. The opposing sealing surfaces are formed to each have a groove 1200 therein to accommodate a sealant 1202 when the opposing sealing surfaces are pressed together. The sealant 1202 can be any suitable sealing material, non-limiting examples of which include an o-ring, an adhesive, glue, liquid rubber or silicone, or any other type of sealant to create a gasket type seal. The groove 1200 can be formed in any suitable shape as needed, non-limiting examples of which include being semi-spherical, square, triangular, rectangular, etc.

Figure 13A:
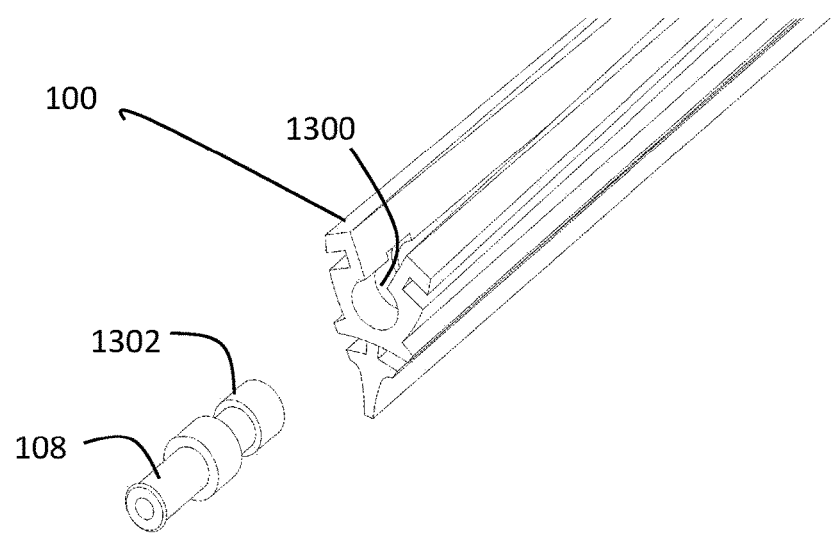
FIG. 13A is an illustration of a grooved recess as formed within the sealable channel to accommodate a ridge or other marking formed on a fitting.
Figure 13B:
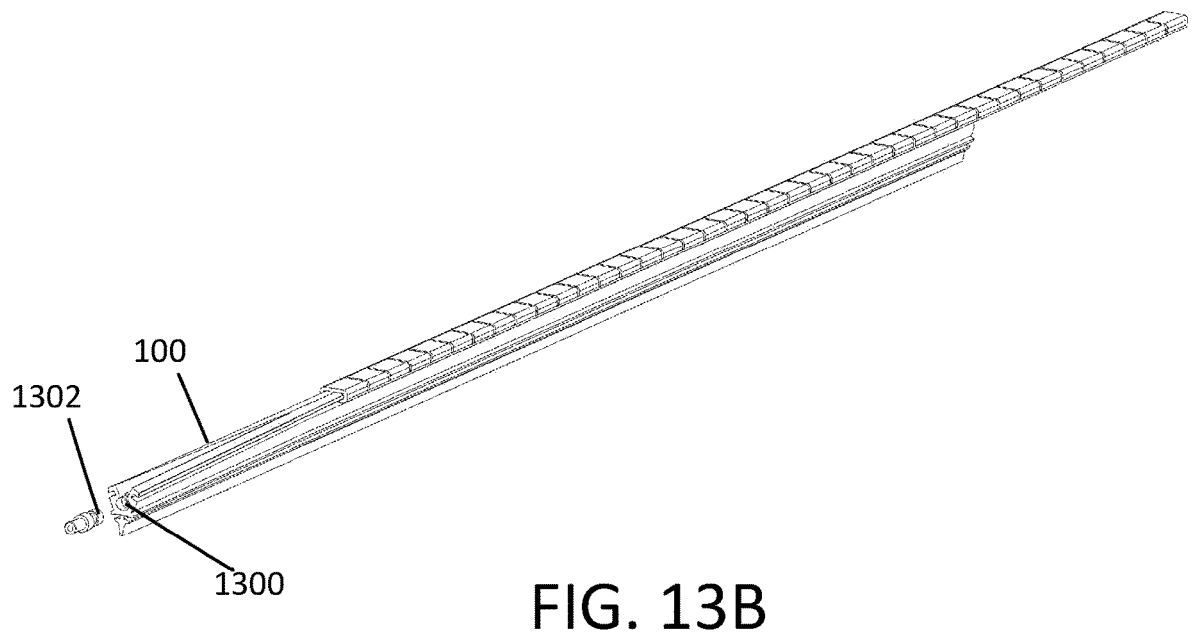
FIG. 13B is an illustration of a grooved recess as formed within the sealable channel to accommodate a ridge or other marking formed on a fitting.

Once assembled in any of the aspects as described herein, a fitting (e.g., plug and barbed hose connector, etc.) would be inserted into the sealable channel at opposing ends. Or, in another aspect, the fitting can be positioned prior to forming the sealable channel. The ends of the elongated channel may or may not have a groove recess machined or molded perpendicularly to the channel or orifice formed to allow a positive interaction (mating engagement) with the fitting having a corresponding detail. For example and as shown in FIGS. 13A and 13B, the windshield wiper apparatus 100 can be formed such that there are grooved recesses 1300 formed within the sealable channel to accommodate a ridge 1302 or other marking formed on the fitting (e.g., hose connector 108, plug or barb fittings). These could be flipped configurations, meaning, the wiper apparatus may have the female groove or indent and the fitting (e.g., hose connector 108, plug or barb fittings) may have the male raised section to interact, or vice versa. Thereafter, the fully assembled wiper apparatus armature can be incorporated into a vehicle's existing wiper fluid delivery system, allowing the dispensing of fluid through the formed channel/orifice, out the holes and onto the glass surface.

Finally, while this invention has been described in terms of several embodiments, one of ordinary skill in the art will readily recognize that the invention may have other applications in other environments. It should be noted that many embodiments and implementations are possible. For example, any of the aspects as described herein can be used interchangeable with one another as may be desired. Further, the following claims are in no way intended to limit the scope of the present invention to the specific embodiments described above. In addition, any recitation of "means for" is intended to evoke a means-plus-function reading of an element and a claim, whereas, any elements that do not specifically use the recitation "means for", are not intended to be read as means-plus-function elements, even if the claim otherwise includes the word "means". Further, while particular method steps have been recited in a particular order, the method steps may occur in any desired order and fall within the scope of the present invention.

What is claimed is:

1. A windshield wiper apparatus, comprising:
    an elongate body member, the elongate body member having a length with a sealable channel therein that runs along the length;
    at single blade that protrudes downward along the length of the elongate body member, the single blade being mobile between a first position and a second position; and
    a series of holes passing from the sealable channel and through the elongate body member proximate the single blade such that a first group of holes is formed to dispense fluid on a first side of the single blade when the single blade is in the first position, and a second group of holes is formed to dispense fluid on a second side of the single blade when the single blade is in the second position, whereby a fluid passing through the sealable channel is dispensed onto a surface proximate the single at least one blade as the blade moves between the first position and second position to divert the fluid between the first and second group of holes.

2. The windshield wiper apparatus as set forth in claim 1, wherein the elongate body member includes first and second opposing parts formed along the length, each of the first and second opposing parts having a bottom portion and a sealable top portion, wherein the bottom portions of the first and second opposing parts are hingedly connected with one another, such that the sealable channel is formed when the sealable top portions of the first and second opposing parts are connected with one another.

3. The windshield wiper apparatus as set forth in claim 2, wherein the sealable top portions of the first and second opposing parts each have exterior surfaces with slots formed therein, such that when the sealable top portions of the first and second opposing parts are positioned together, the slots and sealable top portions collectively form a T-shape.

4. The windshield wiper apparatus as set forth in claim 3, further comprising a clip, the clip passing through the slots to connect the first and second opposing parts with one another and form the sealable channel within the elongate body member.

5. The windshield wiper apparatus as set forth in claim 4, further comprising at least one fitting, and wherein the sealable channel includes opposing ends, with the opposing ends being formed to matingly engage and receive the at least one fitting, such that when the clip connects the first and second opposing parts with one another and forms the sealable channel, the at least one fitting is securely affixed within the sealable channel to form a leakproof seal therebetween.

6. The windshield wiper apparatus as set forth in claim 5, wherein the clip includes a pair of rigid strips passing through the slots, the pair of rigid strips being held together with a wiper carriage.

7. The windshield wiper apparatus as set forth in claim 5, wherein the clip is a u-shaped clip passing through the slots.

8. The windshield wiper apparatus as set forth in claim 7, wherein the u-shaped clip includes a length, with a series of slits formed transverse the length to form a flexible spine.

9. The windshield wiper apparatus as set forth in claim 7, wherein the u-shaped clip is formed of a series of separate u-shaped channel segments, such that the series of separate u-shaped channel segments collectively form a flexible spine.

10. The windshield wiper apparatus as set forth in claim 2, wherein the sealable top portions of the first and second opposing parts each have opposing sealing surfaces, the opposing sealing surfaces being shaped such that when pressed together, a tortious path is formed between the opposing sealing surfaces.

11. The windshield wiper apparatus as set forth in claim 2, wherein the sealable top portions of the first and second opposing parts each have opposing sealing surfaces, the opposing sealing surfaces each having groove formed therein to accommodate a sealant when the opposing sealing surfaces are pressed together.

12. The windshield wiper apparatus as set forth in claim 1, wherein the sealable channel has a surrounding interior wall running along the length of the elongate body member, and wherein one or more grooves are formed in the surrounding interior wall along the length of the body member to add in the formation of the sealable channel.

13. The windshield wiper apparatus as set forth in claim 1, wherein the elongate body member includes a base portion with a sleeve portion extending therefrom, the sleeve portion formed to interlock with the base portion and form the sealable channel therein.

14. The windshield wiper apparatus as set forth in claim 13, wherein the base portion includes a first slot formed therein and a first catch, and wherein the sleeve portion terminates in a second catch, such that when the sleeve portion interlocks with the base portion, the second catch matingly engages with the first catch to form a second slot between the sleeve portion and the base portion.

15. The windshield wiper apparatus as set forth in claim 14, further comprising a clip, the clip passing through the first and second slots to seal the sleeve portion against to the base portion and form the sealable channel within the elongate body member.

16. A windshield wiper apparatus, comprising:
an elongate body member, the elongate body member having a length with a sealable channel therein that runs along the length;
at least one blade that protrudes downward along the length of the elongate body member;
a series of holes passing from the sealable channel and through the elongate body member proximate the at least one blade, whereby a fluid passing through the sealable channel is dispensed onto a surface proximate the at least one blade;
wherein the elongate body member includes a base portion with a sleeve portion extending therefrom, the sleeve portion formed to interlock with the base portion and form the sealable channel therein;
wherein the base portion includes a first slot formed therein and a first catch, and wherein the sleeve portion terminates in a second catch, such that when the sleeve portion interlocks with the base portion, the second catch matingly engages with the first catch to form a second slot between the sleeve portion and the base portion;
a clip, the clip passing through the first and second slots to seal the sleeve portion against to the base portion and form the sealable channel within the elongate body member;
wherein the clip includes a pair of rigid strips passing through the first and second slots, the pair of rigid strips being held together with a wiper carriage.

17. The windshield wiper apparatus as set forth in claim 16, further comprising at least one fitting, and wherein the sealable channel includes opposing ends, with the opposing ends being formed to matingly engage and receive the at least one fitting, such that when the clip connects the first and second opposing parts with one another and forms the sealable channel, the at least one fitting is securely affixed within the sealable channel to form a leakproof seal therebetween.

18. The windshield wiper apparatus as set forth in claim 16, wherein the clip is a u-shaped clip passing through the slots.

19. The windshield wiper apparatus as set forth in claim 18, wherein the u-shaped clip includes a length, with a series of slits formed transverse the length to form a flexible spine.

20. The windshield wiper apparatus as set forth in claim 18, wherein the u-shaped clip is formed of a series of separate u-shaped channel segments, such that the series separate u-shaped channel segments collectively form a flexible spine.

* * * * *